US012627872B2

(12) United States Patent
Byrne et al.

(10) Patent No.: US 12,627,872 B2
(45) Date of Patent: May 12, 2026

(54) VEHICULAR CAMERA ASSEMBLY WITH THERMALLY CONDUCTIVE ADHESIVE INTERFACE

(71) Applicant: Magna Electronics Inc., Auburn Hills, MI (US)

(72) Inventors: Steven V. Byrne, Goodrich, MI (US); Jonathan D. Conger, Huntington Woods, MI (US); Rene Dreiocker, Rochester Hills, MI (US); Matthew C. Sesti, Williamston, MI (US); Gavin E Skrocki, Bay City, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 191 days.

(21) Appl. No.: 18/503,229

(22) Filed: Nov. 7, 2023

(65) Prior Publication Data

US 2024/0155214 A1     May 9, 2024

Related U.S. Application Data

(60) Provisional application No. 63/382,903, filed on Nov. 9, 2022.

(51) Int. Cl.
| | |
|---|---|
| *H04N 23/52* | (2023.01) |
| *G03B 30/00* | (2021.01) |
| *H04N 23/51* | (2023.01) |
| *H04N 23/54* | (2023.01) |

(52) U.S. Cl.
CPC ............. *H04N 23/52* (2023.01); *G03B 30/00* (2021.01); *H04N 23/51* (2023.01); *H04N 23/54* (2023.01)

(58) Field of Classification Search
CPC ........ H04N 23/52; H04N 23/51; H04N 23/54; G03B 30/00
USPC ......................................................... 348/148
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,949,331 A | 9/1999 | Schofield et al. | |
| 6,289,153 B1 * | 9/2001 | Bergmann ............... | G02B 6/32 |
| | | | 385/47 |
| 6,690,268 B2 | 2/2004 | Schofield et al. | |
| 8,542,451 B2 | 9/2013 | Lu et al. | |
| 8,994,878 B2 | 3/2015 | Byrne et al. | |
| 9,233,641 B2 | 1/2016 | Sesti et al. | |
| 9,277,104 B2 | 3/2016 | Sesti et al. | |
| 9,451,138 B2 | 9/2016 | Winden et al. | |
| 9,487,159 B2 | 11/2016 | Achenbach | |

(Continued)

*Primary Examiner* — Matthew David Kim
(74) *Attorney, Agent, or Firm* — HONIGMAN LLP

(57) ABSTRACT

A vehicular camera assembly includes a printed circuit board (PCB) and a camera housing having a first housing portion with a lens barrel that accommodates a lens. An imager at the PCB faces the lens. At least one of (i) the PCB is attached at the first housing portion via a thermally conductive adhesive and (ii) the lens barrel is attached at the first housing portion via the thermally conductive adhesive. The PCB is thermally conductively connected to the first housing portion and, while the vehicular camera assembly is electrically operated to capture image data, heat generated within the camera housing is drawn away from the PCB at least in part through the thermally conductive adhesive and the front housing portion.

22 Claims, 4 Drawing Sheets

(56) References Cited

U.S. PATENT DOCUMENTS

| | | | |
|---|---|---|---|
| 9,596,387 B2 | 3/2017 | Achenbach et al. | |
| 9,621,769 B2 | 4/2017 | Mai et al. | |
| 9,871,971 B2 | 1/2018 | Wang et al. | |
| 9,896,039 B2 | 2/2018 | Achenbach et al. | |
| 10,142,532 B2 | 11/2018 | Mleczko | |
| 10,230,875 B2 | 3/2019 | Mleczko et al. | |
| 10,250,004 B2 | 4/2019 | Conger et al. | |
| 10,272,857 B2 | 4/2019 | Conger et al. | |
| 10,274,812 B1 | 4/2019 | Chen | |
| 10,676,041 B2 | 6/2020 | Sesti et al. | |
| 11,635,672 B2 | 4/2023 | Sesti et al. | |
| 12,174,448 B2 | 12/2024 | Skrocki | |
| 2002/0118929 A1* | 8/2002 | Brun | G02B 6/3863 385/84 |
| 2003/0063832 A1* | 4/2003 | Hellman | G02B 6/2773 385/11 |
| 2006/0222042 A1* | 10/2006 | Teramura | G02B 27/0961 372/101 |
| 2014/0022657 A1* | 1/2014 | Lu | G02B 7/025 359/827 |
| 2015/0124098 A1* | 5/2015 | Winden | H04N 23/55 348/148 |
| 2016/0119509 A1* | 4/2016 | Wato | G03B 17/55 348/148 |
| 2016/0170146 A1* | 6/2016 | Kurokawa | G02B 6/425 385/14 |
| 2016/0268716 A1 | 9/2016 | Conger et al. | |
| 2016/0284752 A1 | 9/2016 | Shi | |
| 2016/0286103 A1 | 9/2016 | Van Dan Elzen | |
| 2017/0054881 A1 | 2/2017 | Conger et al. | |
| 2017/0129419 A1 | 5/2017 | Conger et al. | |
| 2017/0133811 A1 | 5/2017 | Conger et al. | |
| 2017/0201661 A1 | 7/2017 | Conger | |
| 2017/0295306 A1 | 10/2017 | Mleczko | |
| 2017/0302829 A1 | 10/2017 | Mleczko et al. | |
| 2018/0042106 A1 | 2/2018 | Scheja | |
| 2018/0072239 A1 | 3/2018 | Wienecke et al. | |
| 2019/0121051 A1 | 4/2019 | Byrne et al. | |
| 2019/0124238 A1 | 4/2019 | Byrne et al. | |
| 2019/0137724 A1* | 5/2019 | Kim | G02B 7/02 |
| 2019/0306966 A1 | 10/2019 | Byrne et al. | |
| 2019/0381952 A1* | 12/2019 | Wang | G02B 7/02 |
| 2020/0010024 A1 | 1/2020 | Sesti et al. | |
| 2020/0033549 A1 | 1/2020 | Liu et al. | |
| 2020/0070453 A1* | 3/2020 | Piotrowski | B29D 11/00009 |
| 2020/0099837 A1* | 3/2020 | Diesel | G02B 7/021 |
| 2020/0137926 A1 | 4/2020 | Wohlte | |
| 2020/0154020 A1 | 5/2020 | Byrne et al. | |
| 2020/0172019 A1 | 6/2020 | Ding et al. | |
| 2020/0204711 A1 | 6/2020 | Guidi et al. | |
| 2020/0333619 A1 | 10/2020 | Ang et al. | |
| 2020/0412925 A1 | 12/2020 | Byrne et al. | |
| 2021/0021742 A1* | 1/2021 | Winden | C09J 163/00 |
| 2021/0072621 A1 | 3/2021 | Faridian et al. | |
| 2021/0103119 A1 | 4/2021 | Reckker et al. | |
| 2021/0382375 A1 | 12/2021 | Sesti et al. | |
| 2022/0206118 A1* | 6/2022 | Pan | G01S 7/4816 |
| 2022/0360692 A1* | 11/2022 | Chang | H04N 23/54 |
| 2023/0073441 A1* | 3/2023 | Bocock | F21V 23/002 |
| 2025/0116841 A1 | 4/2025 | Skrocki | |

* cited by examiner

230

224

226

222

228

214

VEHICULAR CAMERA ASSEMBLY WITH THERMALLY CONDUCTIVE ADHESIVE INTERFACE

CROSS REFERENCE TO RELATED APPLICATION

The present application claims the filing benefits of U.S. provisional application Ser. No. 63/382,903, filed Nov. 9, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras (such as one or more CMOS cameras) to capture image data representative of images exterior of the vehicle. The camera includes a lens holder, and an imager printed circuit board (imager PCB), with the imager PCB fixed to the lens holder, and with a lens barrel (accommodating a lens or lens assembly therein) attached to the lens holder.

A vehicular camera assembly may include an imager printed circuit board (imager PCB) that includes a first side and a second side opposite the first side and separated from the first side by a thickness of the imager PCB. An imager is disposed at the first side of the imager PCB. The camera includes a lens barrel accommodating a lens. A camera housing includes a first portion and a second portion joined with the first portion. The lens barrel is disposed at the first portion of the camera housing. The imager PCB is attached at the first portion of the camera housing. With the second portion of the camera housing joined with the first portion of the camera housing, the imager at the first side of the imager PCB faces the lens accommodated by the lens barrel. The imager, when the vehicular camera assembly is electrically operated to capture image data, generates heat at the first side of the imager PCB. At least one of (i) the imager PCB is thermally conductively connected to the first portion of the camera housing via a thermally conductive adhesive and (ii) the lens barrel is attached at the first portion of the camera housing via the thermally conductive adhesive. When the vehicular camera assembly is electrically operated, heat generated by the imager is dissipated away from the vehicular camera assembly and drawn away from the first side of the imager PCB at least in part through the thermally conductive adhesive and the first portion of the camera housing. A heat transfer path from the first side of the imager PCB and away from the vehicular camera assembly includes the first portion of the camera housing and a thermally conductive adhesive disposed at the first portion of the camera housing. For example, the thermally conductive adhesive may be used to attach the imager PCB to the first portion of the camera housing or to attach the lens barrel at the first portion of the camera housing.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
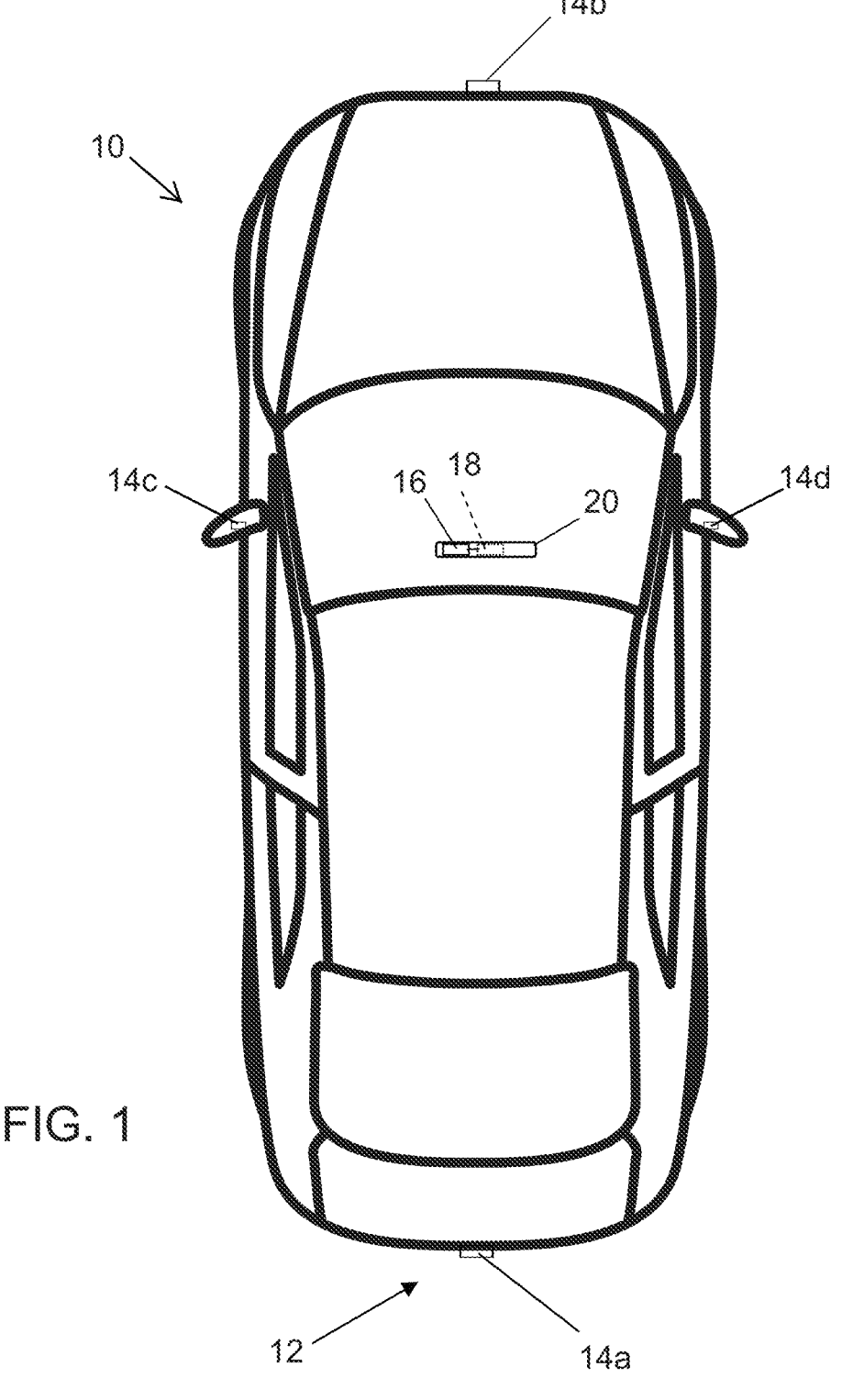
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the system, via processing of captured image data at the ECU, may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, active focus and alignment is used to set and secure a focal position of a lens to an imager component. However, this leads to expensive and complicated measures to manage the compliance tolerances created by camera components and manufacturing focus/alignment processes. For example, a camera may be assembled using an active PCB alignment, which may use screws to secure the PCB to a lens holder or front camera housing. After the PCB is secured to the lens holder, the lens barrel (such as a threaded lens barrel) is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the lens holder or front housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. Optionally, the adhesive may be at least partially cured via ultraviolet (UV) light and may further be cured via additional curing. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the front housing or lens holder utilizing adhesive initially, and then the imager PCB is actively moved relative to the lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV and additional curing. This curing increases the tolerance stack of the finished assembly.

Figure 2:
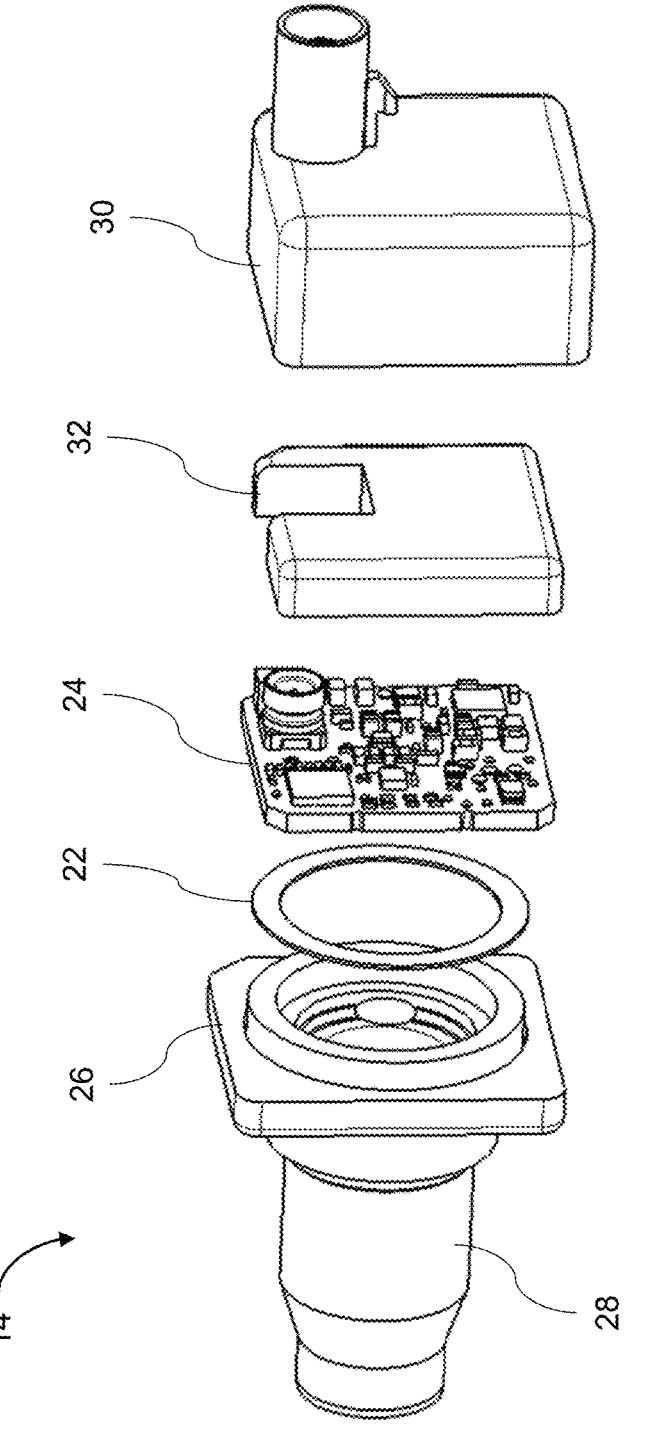
FIG. 2 is an exploded view of a vehicular camera assembly including a non-thermally conductive adhesive and a thermally conductive interface material between the imager PCB and the rear housing portion.

Referring now to FIG. 2, a vehicular camera 14 is assembled using a non-thermally conductive focus and align adhesive 22 disposed between an imager PCB 24 and a lens assembly of the camera 14. The imager PCB 24 has a first side and a second side separated from the first side by a thickness of the imager PCB, where an imager is disposed on the first side of the imager PCB 24 and configured to capture image data. The imager may be focused and aligned with a lens element of the lens assembly in any suitable manner, and the imager PCB is fixed relative to the lens assembly and lens element when the imager is focused and optically aligned via the non-thermally conductive focus and align adhesive 22. For example, alignment of the imager and lens may include characteristics of the processes and camera described in U.S. Publication Nos. US-2022-0373762 and/or US 2021-0382375, which are hereby incorporated herein by reference in their entireties.

The lens assembly includes a lens holder or front housing portion 26 of the camera 14 that accommodates a lens barrel

28. The lens barrel 28 has an inner end configured to face the first side of the imager PCB 24 and an outer end, and the lens barrel 28 accommodates at least one lens element or optic element along a length of the lens barrel 28. With the imager PCB adhered to the lens assembly, the imager views through the lens element of the lens assembly. A rear cover or rear housing portion 30 is configured to join to the front housing portion 26 to house the imager PCB 24 between the front housing 26 and the rear housing 30. That is, the camera 14 is closed by the rear cover 30. The front housing and the rear housing may comprise any suitable material, such as a metallic material, a plastic material, or the like.

As the camera 14 captures image data, one or more electrical components (such as the imager and/or the image processor) generate heat at the imager PCB 24 as the camera is electrically operated. If the heat generated at the imager PCB 24 is not dissipated from the imager PCB 24 and the interior of the camera housing, the temperature at the imager PCB 24 may exceed safe operating temperatures for electronic components at the imager PCB 24, thus affecting operation and performance of the camera. A thermal interface material 32, such as a thermal paste or thermal pad, is disposed between the rear housing 30 and the second side of the imager PCB 24 to transfer heat from the one or more heat generating electrical components such as the imager PCB 24 to the rear housing 30. Thus, the imager PCB 24 is thermally conductively connected to the rear housing 30 to dissipate heat away from the camera 14 via the thermal interface material 32 and the rear housing 30.

Because the focus and align adhesive 22 is not thermally conductive, thermal transfer between the imager PCB 24 and the front housing 26 may not occur or may be minimal. Furthermore, the focus and align adhesive 22 may or may not be a closed ring. Thus, because the focus and align adhesive 22 is not thermally conductive, a heat transfer path from the imager or sensor and/or processor or other components at the imager PCB 24 and away from the camera 14 is through the imager PCB 24, through the thermal paste or thermal interface material 32, and through the rear cover 30 to the environment.

Figure 3:
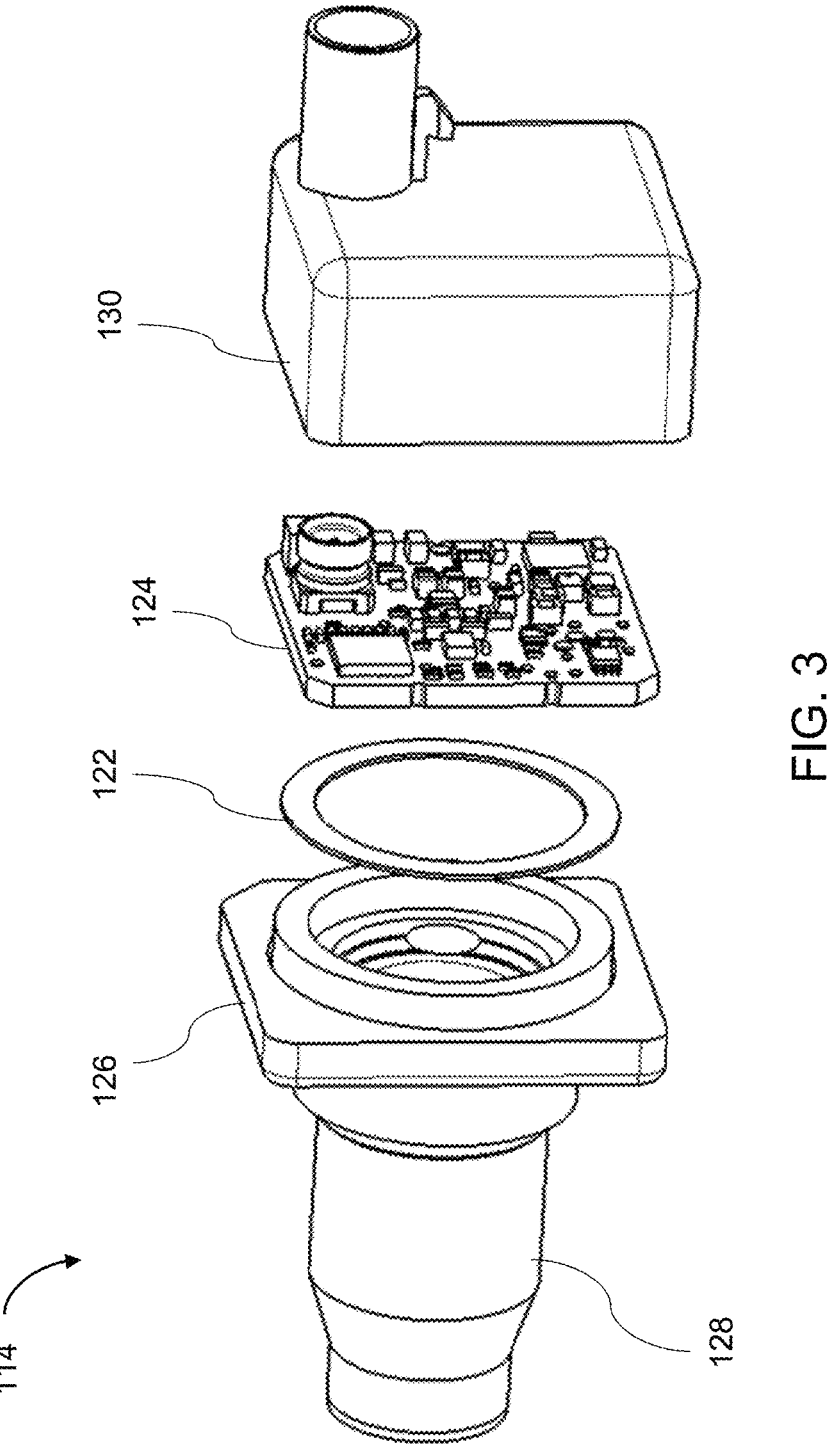
FIG. 3 is an exploded view of a vehicular camera assembly including a thermally conductive adhesive between the imager PCB and the front housing portion.

As shown in FIG. 3, a vehicular camera 114 may be assembled using a thermally conductive focus and align adhesive 122 disposed between the lens assembly and the imager PCB 124. In other words, the imager PCB 124 is attached to the lens or lens holder 126 by the thermally conductive focus and align adhesive 122 and the camera 114 is closed by the rear cover 130. The thermally conductive focus and align adhesive 122 may or may not be a closed ring. For example, the thermally conductive focus and align adhesive 122 may comprise a thermally conductive adhesive tape or glue or the like disposed at the first side of the imager PCB 124 around the imager (i.e., a perimeter defined by the thermally conductive adhesive encircles or circumscribes the imager at the first side of the imager PCB). The thermally conductive adhesive 122 may be disposed at the first side of the imager PCB 124 or at a perimeter edge region of the imager PCB 124 and attaching the imager PCB 124 to the front housing 126. During operation of the camera, heat generated at the imager PCB 124 (such as at the imager and/or the image processor) is dissipated to the lens holder 126 via the thermally conductive connection provided between the imager PCB 124 and the lens holder 126 by the thermally conductive adhesive 122.

Thus, no thermal interface material is required between the imager PCB 124 and the rear housing 130 because heat may be dissipated away from the imager and imager PCB 124 away from the camera through the thermally conductive connection between the imager PCB 124 and the lens holder 126 provided by the focus and align adhesive 122. Thus, a heat transfer path from the imager or sensor and/or processor or other components at the imager PCB 124 and away from the camera 14 is through the thermally conductive focus and align adhesive 122, through the lens holder 126 and lens barrel 128, and to the environment. The lens holder 126 may comprise any suitable thermally conductive material, such as a metallic material. Optionally, the thermal interface material may be included to also provide heat dissipation through the rear cover 130 to the environment.

By using the thermally conductive adhesive, the temperature of the imager or sensor and/or image processor may be kept in a safe range without the use of any thermal interface material between the imager PCB and the rear housing. Furthermore, a closed glue ring of the thermally conductive focus and align adhesive 122 (that encircles or circumscribes or surrounds the imager at the imager PCB, with an air gap between the imager and the lens optics) may protect the optical path of the lens and image sensor from contamination, such as moisture or dust particles.

Moreover, heat transfer from the imager and imager PCB 124 to the lens holder 126 and lens barrel 128 and lens may help reduce the risk of ice or fog forming at the lens when the camera is exposed at the exterior of the vehicle during cold and/or humid environmental conditions. That is, heat generated at the imager PCB 124 may heat the lens assembly and reduce ice and/or condensation forming at the lens. Thus, use of the thermally conductive focus and align adhesive 122 may reduce or eliminate the need for lens heaters at the camera assembly.

Thus, the thermally conductive adhesive 122 may be disposed at the lens holder 126 and/or the imager PCB 124 and may circumscribe the imager prior to focus and alignment of the lens and imager. The imager PCB 124 may then be joined to the lens holder 126 and the imager PCB 124 and/or lens holder 126 and/or the lens barrel 128 may be adjusted to focus and optically align the lens and the imager. With the lens and imager aligned and focused, the thermally conductive adhesive 122 may be cured (e.g., via exposure to UV light or via thermal curing) to secure the lens holder 126 relative to the imager PCB 124 and set the focus and alignment of the lens and the imager.

Figure 4:
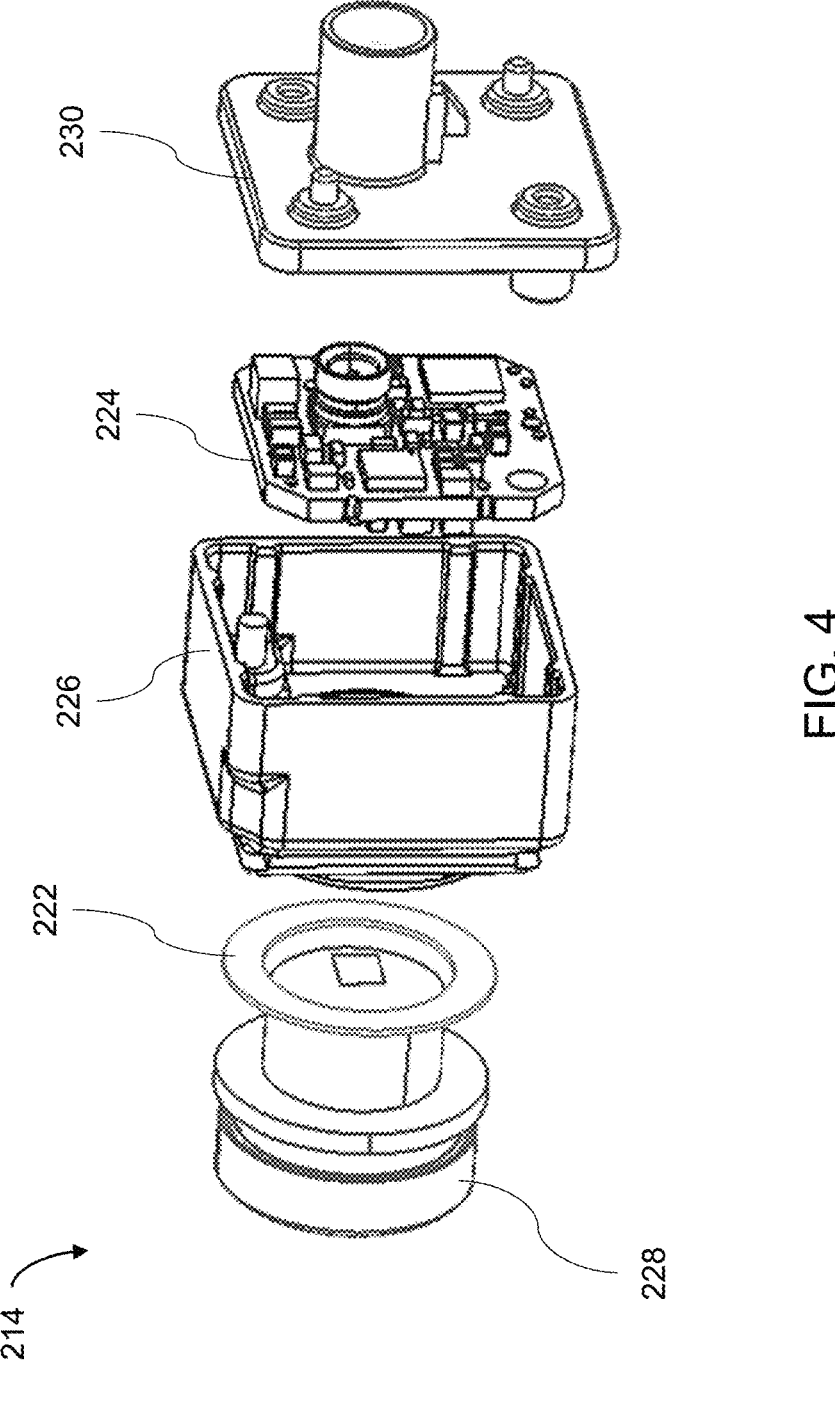
FIG. 4 is an exploded view of a vehicular camera assembly including a thermally conductive adhesive between the lens barrel and the front housing portion.

As shown in FIG. 4, a vehicular camera 214 includes an imager PCB 224 having an imager and that is attached to the lens holder or front housing 226. For example, the imager PCB 224 may be attached to the lens holder 226 via screws or other fasteners, orbital forming, pins, or the imager PCB 224 may be sandwiched between the front housing 226 and the rear housing or rear cover 230. The lens or lens barrel 228 is attached to the lens holder 230 via a thermally conductive focus and align adhesive 222, such as a thermally conductive adhesive tape or glue disposed between the inner end of the lens barrel 228 and the lens holder 226 and circumscribing the inner end of the lens barrel 228. The thermally conductive adhesive 222 may be disposed at the outer side of the front housing 226 and/or the inner end of the lens barrel 228.

Thus, a heat transfer path from the imager or sensor and/or processor or other components at the imager PCB 224 and away from the camera 214 is through the lens holder 226, through the thermally conductive adhesive 222, through the lens barrel 228, and to the environment. By using the thermally conductive adhesive, heat generated at the imager PCB (such as heat generated by the image sensor and/or other heat generating electrical components at the imager PCB) transfers to the lens and heats the lens, thus preventing lens condensation and fogging. The thermally conductive glue connects the lens to the lens holder (thermally), thus increasing the overall mass of the heat sink, which further reduces the temperature of the image sensor and allows for camera operation at higher environmental temperatures and/or a smaller camera size. In other words, thermally connecting the lens barrel to the lens holder and therefore imager PCB via thermally conductive adhesive allows heat to be dissipated away from the camera through the lens barrel and lens holder, thus improving overall heat dissipation from the camera.

The thermally conductive adhesive 222 may be disposed at the lens holder 226 and/or the lens barrel 228 prior to focus and alignment of the lens and the imager. With the imager PCB 224 joined to the lens holder 226 or rear housing 230, the lens barrel 228 is joined to the lens holder 226 via the adhesive 222. The lens barrel 228 may then be adjusted relative to the imager PCB 224 and the lens holder 226 to focus and align the imager and the lens. With the lens and imager aligned and focused, the thermally conductive adhesive 222 may be cured to secure the lens barrel 228 relative to the lens holder 226 and the imager PCB 224 and set the focus and alignment of the lens and imager.

Thus, a vehicular camera includes a thermally conductive adhesive material that sets or fixes the imager and imager PCB relative to the lens or lens element during focus and alignment of the imager and lens. The thermally conductive adhesive provides a heat dissipation path from the imager and/or processor or other heat generating components at the imager PCB and through the front housing portion away from the camera. That is, heat generated at the imager PCB (or elsewhere within the camera housing) during operation of the camera may be dissipated away from the camera through the thermally conductive adhesive and the front housing portion or lens holder. For example, the thermally conductive adhesive may be disposed between the imager PCB and the lens holder or lens. Optionally, the thermally conductive adhesive is disposed between the lens barrel and the lens holder. Thus, the vehicular camera assembly does not require a thermally insulating interface material between the imager PCB and the rear housing and thermal dissipation from the camera is improved, allowing for improved performance at increased environmental temperatures and reduced camera size and reduced cost.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. No. 10,099,614 and/or 10,071,687, which are hereby incorporated herein by reference in their entireties.

The system may include an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera assembly or module may utilize aspects of the cameras and connectors described in U.S. Pat. Nos. 10,272, 857; 10,250,004; 10,230,875; 10,142,532; 9,621,769; 9,277, 104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0129419; US-2017-0133811; US-2017-0201661; US-2017-0280034; US-2017-0295306 and/or US-2018-0098033, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:
   a printed circuit board (PCB), the PCB having a first side and a second side separated by a thickness dimension of the PCB;
   wherein an imager is disposed at the first side of the PCB;
   a camera housing comprising a first housing portion and a second housing portion joined with the first housing portion;
   wherein a lens barrel is disposed at the first housing portion, and wherein the lens barrel accommodates a lens;
   a thermally conductive adhesive;
   wherein at least one selected from the group consisting of (i) the PCB is attached at the first housing portion via the thermally conductive adhesive and, with the thermally conductive adhesive disposed between the PCB and the first housing portion, the PCB is adjustable relative to the first housing portion to align the imager and the lens and (ii) the lens barrel is attached at the first housing portion via the thermally conductive adhesive and, with the thermally conductive adhesive disposed between the lens barrel and the first housing portion, the lens barrel is adjustable relative to the first housing portion to align the imager and the lens;

wherein, with the imager and the lens aligned, the thermally conductive adhesive is cured to fix the imager relative to the lens;
   wherein, with the second housing portion joined with the first housing portion, the imager at the first side of the PCB faces the lens accommodated by the lens barrel;
   wherein, when the vehicular camera assembly is electrically operated to capture image data, heat is generated within the camera housing; and
   wherein the PCB is thermally conductively connected to the first housing portion, and wherein, while the vehicular camera assembly is electrically operated to capture image data, heat generated within the camera housing is drawn away from the PCB at least in part through the thermally conductive adhesive and the first housing portion.

2. The vehicular camera assembly of claim 1, wherein the PCB is attached at the first housing portion via the thermally conductive adhesive and, with the thermally conductive adhesive disposed between the PCB and the first housing portion, the PCB is adjustable relative to the first housing portion to align the imager and the lens.

3. The vehicular camera assembly of claim 2, wherein the thermally conductive adhesive comprises an adhesive ring disposed between the first side of the PCB and the first housing portion.

4. The vehicular camera assembly of claim 3, wherein the adhesive ring circumscribes the imager at the first side of the PCB.

5. The vehicular camera assembly of claim 3, wherein the adhesive ring comprises a continuous ring.

6. The vehicular camera assembly of claim 3, wherein the adhesive ring comprises a non-continuous ring.

7. The vehicular camera assembly of claim 1, wherein the lens barrel is attached at the first housing portion via the thermally conductive adhesive and, with the thermally conductive adhesive disposed between the lens barrel and the first housing portion, the lens barrel is adjustable relative to the first housing portion to align the imager and the lens.

8. The vehicular camera assembly of claim 7, wherein the thermally conductive adhesive comprises an adhesive ring disposed between an inner end of the lens barrel and an outer portion of the first housing portion.

9. The vehicular camera assembly of claim 7, wherein, while the vehicular camera assembly is electrically operated to capture image data, heat generated within the camera housing is drawn away from the first housing portion at least in part through the thermally conductive adhesive and the lens barrel.

10. The vehicular camera assembly of claim 7, wherein heat generated within the camera housing at least partially heats the lens accommodated by the lens barrel.

11. The vehicular camera assembly of claim 1, wherein a heat transfer path from the PCB and away from the vehicular camera assembly comprises the first housing portion and the thermally conductive adhesive.

12. The vehicular camera assembly of claim 11, wherein the heat transfer path further comprises the lens barrel.

13. The vehicular camera assembly of claim 1, wherein, when the vehicular camera assembly is electrically operated to capture image data, heat is generated within the camera housing by at least one selected from the group consisting of (i) the imager and (ii) an image processor of the vehicular camera assembly that processes captured image data.

14. A vehicular camera assembly, the vehicular camera assembly comprising:

a printed circuit board (PCB), the PCB having a first side and a second side separated by a thickness dimension of the PCB;

wherein an imager is disposed at the first side of the PCB;

a camera housing comprising a first housing portion and a second housing portion joined with the first housing portion;

wherein a lens barrel is disposed at the first housing portion, and wherein the lens barrel accommodates a lens;

wherein the PCB is attached at the first housing portion via a thermally conductive adhesive;

wherein, with the second housing portion joined with the first housing portion, the imager at the first side of the PCB faces the lens accommodated by the lens barrel;

wherein, with the thermally conductive adhesive disposed between the PCB and the first housing portion, the PCB is adjustable relative to the first housing portion to align the imager and the lens, and wherein, with the imager and the lens aligned, the thermally conductive adhesive is cured to fix the imager relative to the lens;

wherein, when the vehicular camera assembly is electrically operated to capture image data, heat is generated within the camera housing by at least one selected from the group consisting of (i) the imager and (ii) an image processor of the vehicular camera assembly that processes captured image data; and wherein the PCB is thermally conductively connected to the first housing portion, and wherein, while the vehicular camera assembly is electrically operated to capture image data, heat generated within the camera housing is drawn away from the PCB at least in part through the thermally conductive adhesive and the first housing portion.

15. The vehicular camera assembly of claim 14, wherein the thermally conductive adhesive comprises an adhesive ring disposed between the first side of the PCB and the first housing portion.

16. The vehicular camera assembly of claim 15, wherein the adhesive ring circumscribes the imager at the first side of the PCB.

17. The vehicular camera assembly of claim 15, wherein the adhesive ring comprises one selected from the group consisting of (i) a continuous ring and (ii) a non-continuous ring.

18. The vehicular camera assembly of claim 14, wherein a heat transfer path from the PCB and away from the vehicular camera assembly comprises (i) the first housing portion, (ii) the thermally conductive adhesive and (iii) the lens barrel.

19. A vehicular camera assembly, the vehicular camera assembly comprising:

a printed circuit board (PCB), the PCB having a first side and a second side separated by a thickness dimension of the PCB;

wherein an imager is disposed at the first side of the PCB;

a camera housing comprising a first housing portion and a second housing portion joined with the first housing portion;

wherein a lens barrel is disposed at the first housing portion, and wherein the lens barrel accommodates a lens;

wherein the lens barrel is attached at the first housing portion via a thermally conductive adhesive;

wherein, with the second housing portion joined with the first housing portion, the imager at the first side of the PCB faces the lens accommodated by the lens barrel;

wherein, with the thermally conductive adhesive disposed between the lens barrel and the first housing portion, the lens barrel is adjustable relative to the first housing portion to align the imager and the lens, and wherein, with the imager and the lens aligned, the thermally conductive adhesive is cured to fix the imager relative to the lens;

wherein, when the vehicular camera assembly is electrically operated to capture image data, heat is generated within the camera housing by at least one selected from the group consisting of (i) the imager and (ii) an image processor of the vehicular camera assembly that processes captured image data; and wherein the PCB is thermally conductively connected to the first housing portion, and wherein, while the vehicular camera assembly is electrically operated to capture image data, heat generated within the camera housing is drawn away from the PCB at least in part through (i) the first housing portion, (ii) the thermally conductive adhesive and (iii) the lens barrel.

20. The vehicular camera assembly of claim 19, wherein the PCB is attached at the first housing portion via the thermally conductive adhesive.

21. The vehicular camera assembly of claim 20, wherein the thermally conductive adhesive comprises an adhesive ring disposed between an inner end of the lens barrel and an outer portion of the first housing portion.

22. The vehicular camera assembly of claim 19, wherein heat generated within the camera housing at least partially heats the lens accommodated by the lens barrel.

* * * * *